United States Patent [19]
Lundquist et al.

[11] Patent Number: 5,495,509
[45] Date of Patent: Feb. 27, 1996

[54] HIGH PROCESSING GAIN ACQUISITION AND DEMODULATION APPARATUS

[75] Inventors: Alan E. Lundquist, Salt Lake City; John W. Zscheile, Jr., West-Farmington; Samuel C. Kingston, Salt Lake City, all of Utah

[73] Assignee: Loral Corporation, New York, N.Y.

[21] Appl. No.: 216,746

[22] Filed: Mar. 23, 1994

[51] Int. Cl.$^6$ ............................... H04L 7/00; H04J 3/06; H04B 1/707

[52] U.S. Cl. ........................ 375/367; 375/208; 370/107

[58] Field of Search .............................. 375/208, 367, 375/366; 370/107

[56] References Cited

U.S. PATENT DOCUMENTS

| | | | |
|---|---|---|---|
| 4,291,409 | 9/1981 | Weinberg et al. | 375/367 |
| 4,638,494 | 1/1987 | Kartchner et al. | 375/367 |
| 4,701,939 | 10/1987 | Stutt et al. | 375/366 |
| 5,315,616 | 5/1994 | DeLisle et al. | 375/208 |
| 5,414,730 | 5/1995 | Lundquist et al. | 375/208 |

OTHER PUBLICATIONS

"PA-100 Preliminary Product Information", Paramax Systems Corp. (date must be at the latest Feb. 1993, as the section on the Evaluation Board is dated Feb. 25, 1993).

*Primary Examiner*—Stephen Chin
*Assistant Examiner*—Jeffrey W. Gluck
*Attorney, Agent, or Firm*—Glenn W. Bowen; John B. Sowell; Stanton D. Weinstein

[57] ABSTRACT

Apparatus for rapidly acquiring a high performance gain long PN code having a preamble header in real time includes appratus for rapid acquiring and tracking a short PN code in said preamble header and further includes apparatus for demodulating and tracking a long PN code which follows said preamble header. After acquiring the short PN code, the short PN replica code is applied to the long code demodulation and tracking apparatus. The short PN code is employed to synchronize the long code demodulation and tracking apparatus by detecting the time of occurrence of a sync word in said preamble header and is employed to generate a switch point signal and switch from a short PN replica code to a long PN replica code at the input to the long code demodulation and tracking device in real time.

9 Claims, 4 Drawing Sheets

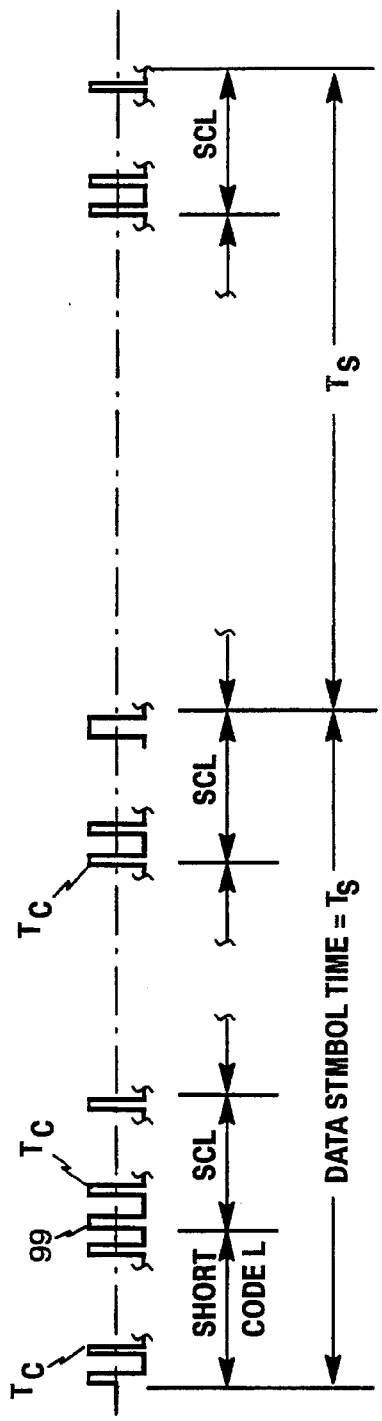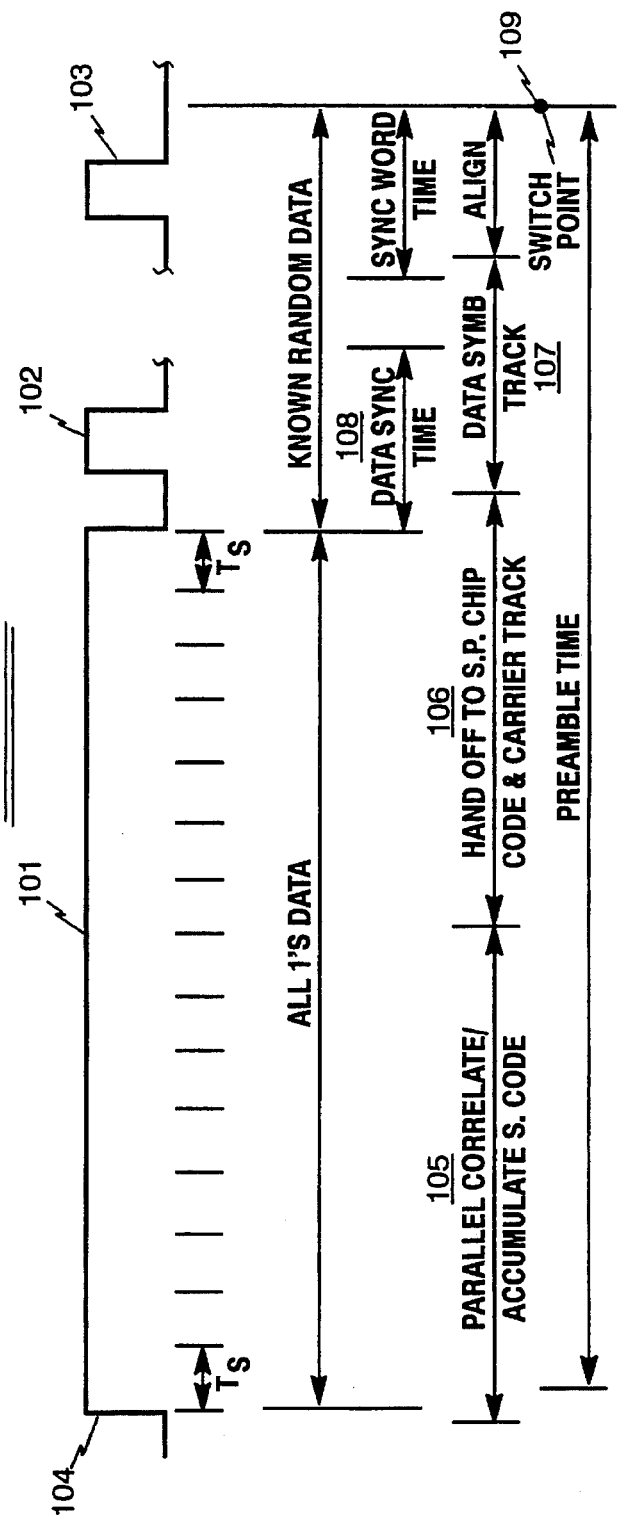
*Figure 4*
*Figure 5*

HIGH PROCESSING GAIN ACQUISITION AND DEMODULATION APPARATUS

BACKGROUND OF THE INVENTION

1. Field of the Invention

The present invention relates to rapid acquisition and demodulation systems. More particularly, the present invention relates to a high speed, high performance acquisition system which is designed to operate in real time to receive, acquire and lock onto a received PN coded signal by first processing a preamble or header before receiving a long PN code for high performance gain.

2. Description of the Prior Art

A high processing gain acquisition and demodulation system implies that there are a very large number of PN chips included in each data symbol time, thus, high performance systems have less energy per chip. It is necessary to process the high performance PN coded information over a very large number of data symbol times to build up a sufficient signal to noise ratio to acquire the incoming signal.

It has been suggested to use matched filters and/or parallel correlations to enhance the build up of the signal to noise ratio of the PN coded signals over fewer data symbol times. It is presently not commercially feasible to build parallel correlators or matched filers with enough taps to acquire the received high performance system PN signal in real time.

Thus it would be highly desirable to provide an apparatus or system capable of acquiring high speed, high performance, high processing gain PN coded signals in real time.

SUMMARY OF THE INVENTION

It is a primary object of the present invention to provide a novel high speed and high performance gain acquisition system which is capable of rapidly locking on to a preamble or header in a burst of PN coded data in a single pass and in real time.

It is a primary object of the present invention to provide an apparatus for receiving a PN code which contains a header or preamble which comprises a plurality of repetitions of a short code which are followed by a long high performance gain PN code.

It is a primary object of the present invention to provide a novel parallel correlator which accommodates the complete short code in the preamble of a received PN coded signal.

It is a primary object of the present invention to provide a novel acquisition and demodulation system for receiving and processing a novel preamble PN code which precedes a long PN code.

It is a primary object of the present invention to provide a novel acquisition and demodulation apparatus which acquires and tracks a short code and its carrier to enable acquisition of a data symbol sync word which in turn enables the system to switch to reception of a long PN code while maintaining tracking of the PN codes and its carrier.

It is a primary object of the present invention to provide an acquisition and demodulation apparatus for receiving a burst of PN coded signals which is insensitive to the range and time of the reception of the transmitted signal.

It is a general object of the present invention to provide a rapid acquisition system for receiving high processing gain PN spread spectrum signals for acquiring the received signal faster than systems known heretofore.

According to these and other objects of the present invention, there is provided a novel acquisition and demodulation system for rapidly acquiring and locking on to a received high processing gain PN coded signal which is independent of time of reception. The novel system comprises a parallel correlator for receiving and acquiring a PN coded signal with a preamble or header which embraces a plurality of data symbol times ($T_s$). At least one or more of the data symbol times comprises a plurality of short PN codes whose length is matched to a parallel correlator and associated buffer accumulator capable of acquiring the short PN code during several repetitions of the short code. After acquisition of the received signal it is switched to a code and carrier tracking circuit capable of demodulating the preamble data. The code and carrier tracking circuit is capable of processing the known random data in the preamble or header while tracking the data symbol time until a sync word is detected. The detected sync word in the header contains countdown information which enables the comparison circuits to generate a switch point signal at the effective end of the preamble at which time the acquisition and demodulation system switches the replica PN code generator from a short code generation to a long code generation while maintaining code and carrier tracking.

BRIEF DESCRIPTION OF THE DRAWINGS

FIG. 4 is a schematic timing diagram employed to illustrate the novel symbol data time comprising a plurality of short PN codes each comprising a plurality of chips; and FIG. 5 is a schematic timing diagram employed to illustrate the novel preamble which precedes the high performance gain long PN code and the timing of events during processing of the novel preamble which comprises short PN codes and sync data.

DETAILED DESCRIPTION OF THE PREFERRED EMBODIMENT

Before explaining the drawings in the preferred embodiment system, the problem to be solved should be more clearly identified. Acquisition and demodulation systems are employed to recover data transmitted between data links. When the data to be recovered is modulated on to a carrier and further modulated or spread by a spread spectrum PN code, it is necessary to generate a replica PN code at the receiver which is synchronized to the PN code generated at the transmitter to facilitate acquisition and recovery of data.

High processing gain codes employ long PN codes and a very large number of chips per data symbol time. The transmitted energy per chip of the high processing gain codes requires that the received signal energy level be accumulated over a large number of data symbol times in order to build up a signal to noise ratio energy level sufficient to detect the PN code before acquiring the code. Thus, acquisition of high processing gain PN codes has heretofore required an inordinate amount of time. The present invention virtually eliminates the long accumulation of energy time by employing a novel preamble which contains short codes that are rapidly acquired. The preamble also contains random data employed to synchronize the switching of the PN replica code generator from a short code to a high processing gain long code without losing synchronization of the received long code which follows the preamble.

Figure 1:
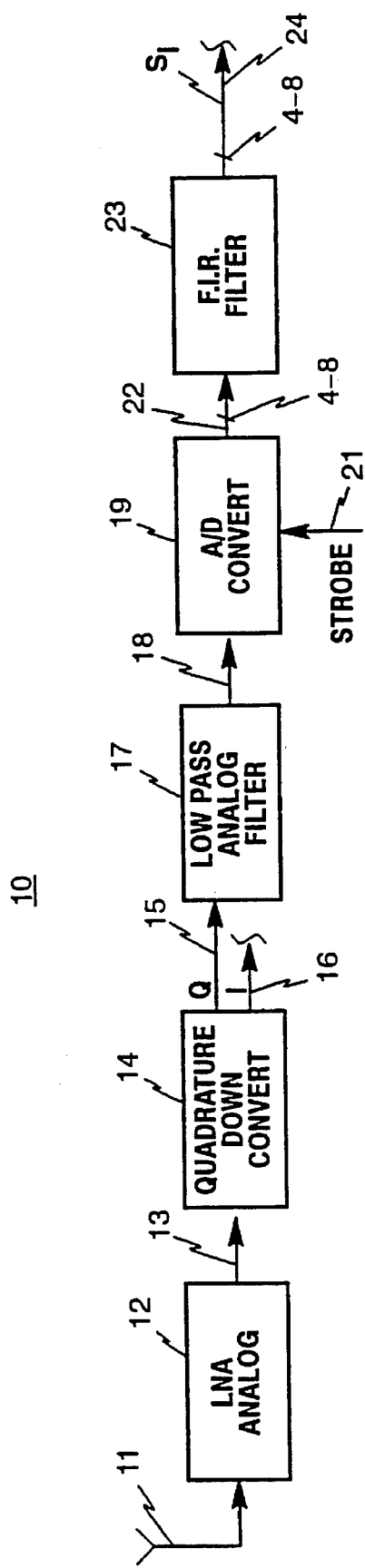
FIG. 1 is a schematic block diagram of a typical prior art front end receiver.

Refer now to FIG. 1 showing a schematic block diagram of a preferred front end receiver 10 shown having an antenna 11 coupled to a low noise amplifier 12. The output of the low noise amplifier on line 13 is coupled to a quadrature down converter 14. The output of the quadrature down converter 14 is shown having a real (I) output on line 15 coupled to a low pass analog filter 17. The imaginary (Q) output on line 16 is shown broken and it will be understood that the imaginary signal from the down converter 14 will be processed the same as the real (I) output 15 to be described in greater detail hereinafter.

The output of the low pass analog filter 17 on line 18 is applied as a serial input to an analog to digital converter 19 to produce a parallel 4 to 8 bit digital output on line 22 which is coupled to a finite impulse response (FIR) filter 23. The output of the FIR filter on line 24 is shown as the S1 signal. The analog to digital converter is shown having a strobe input 21 which is generated at the micro-processor control 66 shown in FIG. 2 and to be described in greater detail hereinafter.

Figure 2:
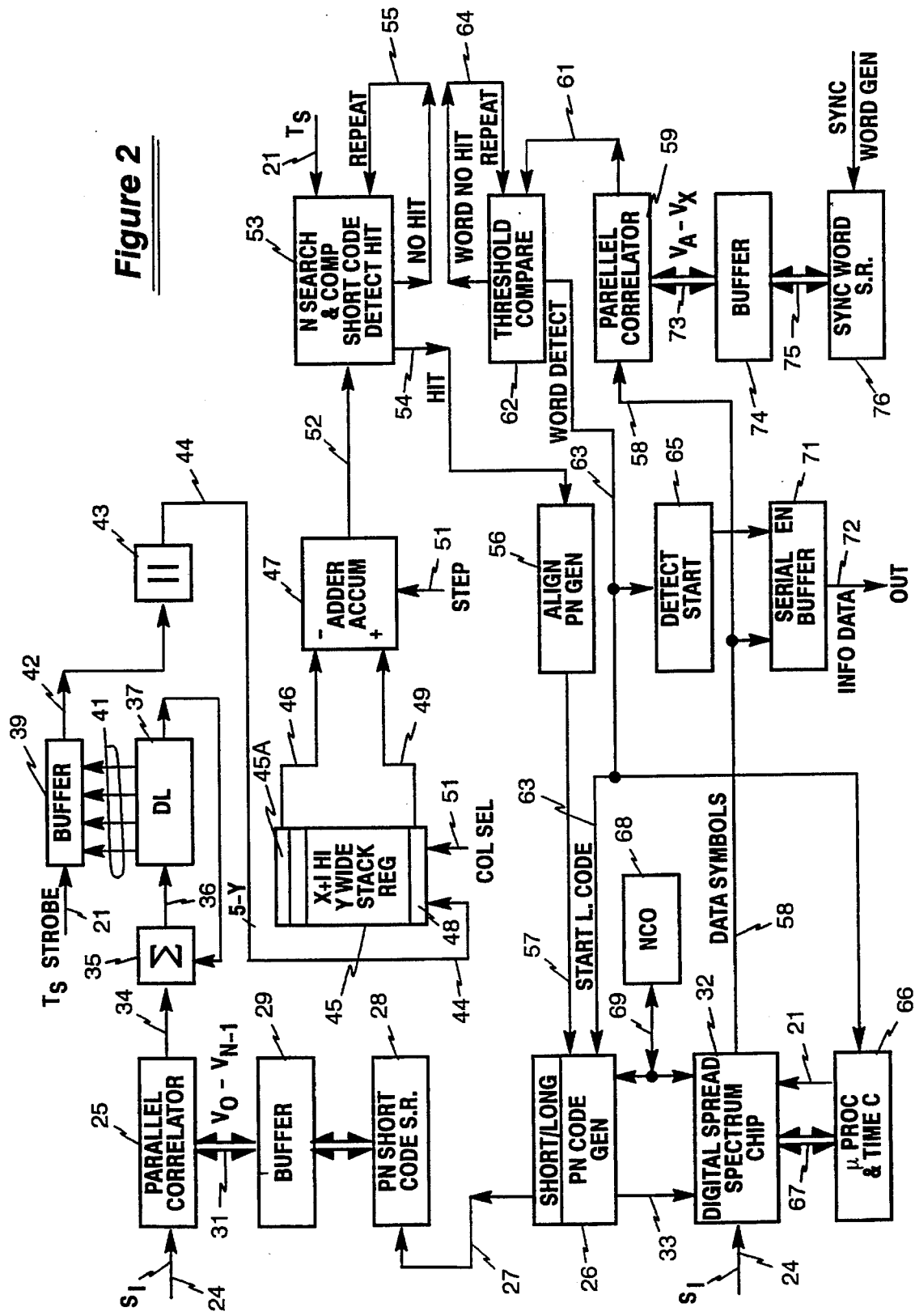
FIG. 2 is a detailed schematic block diagram of the novel preferred embodiment acquisition and demodulation system of the present invention.

Refer now to FIG. 2 showing a detailed schematic block diagram of the novel preferred embodiment of the acquisition and demodulation system of the present invention. The S1 line 24 is shown connected as an input to a parallel correlator 25 which in the present invention is employed to process the short code only, which will be described in greater detail hereinafter. The short PN code is being produced by the PN code generator 26 before the reception of any signal. The short code appears on line 27 and is coupled to a PN short code shift register 28. The short code in shift register 28 is applied in parallel to buffer 29. Buffer 29 generates on bus 31 signals V0 to VN-1 coupled to the parallel correlator 25. At the same time parallel correlator 25 is receiving the signal S1 on line 24, the same S1 signal on line 24 is being received by digital spread spectrum chip 32, which is also coupled to the PN code generator 26 and the short PN code on line 33. Both the parallel correlator 25 and the digital spread spectrum chip 32 are operating at the same time when the short code is being acquired. The output of the correlator 25 on line 34 is applied as an input to a summing circuit 35 shown having an output 36 applied to a delay line or shift register 37. The output of the shift register 37 on line 38 is applied as a feedback signal to the summing circuit 35 to coherently accumulate signals over a plurality of data symbol times. A data symbol time ($T_s$) comprises a large number of chip times. After accumulating data in the circuit 37, a $T_s$ strobe signal on line 21 is applied to the buffer 39 to load the buffer via parallel lines 41 from the shift register 37. The output of buffer 39 on line 42 is applied to the input of an absolute value detector 43 shown having an output 44 applied to the input of a stack of registers 45 indicated to be X+1 high by Y wide. The top register 45A is shown connected by line 46 to the negative input of adder accumulator 47. The first register 48 of the stack 45 represents the latest or new information and is coupled by line 49 to the positive input of the adder accumulator 47. A timing or step input on lines 51 is applied to the adder accumulator 47 to enable the inputs on lines 46 and 49 to be stepped across the width of the stack Y number of times during each $T_s$ interval. By stepping the inputs to the adder accumulator 47, it is not necessary to duplicate the adders in the present embodiment.

The stack 45 and adder 47 perform a noncoherent accumulation of the last X number of outputs from buffer 39. The noncoherent accumulation in adder 47 is applied to line 52 as an input to the N search and compare circuit 53. When sufficient energy is built up to identify a short PN code input alignment, there is produced an output signal on line 54 designated as a hit. It will be observed that if there is no hit, a repeat signal is produced on line 55 which causes the search and compare circuit 53 to continue to search and compare until it determines and identifies a PN code in alignment with the incoming short code. The hit signal on line 54 is applied as an input to the logic circuit 56 which aligns the PN generator 26. The output of the logic alignment circuit 56 on line 57 is applied as an input to the PN code generator 26 which identifies the proper PN code and produces a short code on output line 27 which is in alignment with the short code being received on the line 24 as the incoming signal. The newly aligned PN generator short code on line 33 is applied to the digital spread spectrum chip 32 which also receives the incoming signal and is automatically aligned with the incoming short code on line 24. Chip 32 is preferably a commercially available chip which performs acquisition, tracking, carrier recovery and data demodulation of the incoming signal applied on line 24. Such chips are commercially available from Unisys Corporation and are identified as a PA-100 digital spread spectrum chip. The output of chip 32 on line 58 contains the demodulated data symbols generated from the preamble information. The information on line 58 is applied to a second parallel correlator 59 shown having an output 61 coupled as an input to a threshold and compare circuit 62 which produces a word detect signal on line 63 or a no word hit signal on line 64 which causes the threshold compare circuit to repeat its threshold and compare operation until a hit or word detection occurs on line 63. The word detection signal on line 63 is applied as input signal to the detect start circuit 65 and also applied as a start long code signal to the PN code generator 26. Once the long code starts, the long code appears on line 26 but does not appear on the short code line 27. Code switching occurs instantaneously, and the digital spread spectrum chip 32 maintains its synchronization because the end of the preamble is identified as a switching point that occurs at the start of the long code signal which will be described in greater detail hereinafter with regards to the timing diagrams.

Microprocessor and timing control circuits 66 are shown having a plurality of timing signals on line 21 and coupled by a command and data bus 67 to the chip 32. It will be understood that the bus 67 and lines 21 are coupled to other elements of the system shown in FIG. 2 which require timing and commands. In the preferred embodiment of the present invention, the chip 32 is shown having an external numerical controlled oscillator 68 coupled to the chip via line 69 which is also coupled to the PN code generator 26. After the preamble is complete and the chip 32 is ready to receive the long code at the input line 24, the information being produced on line 58 will now include information and data which is demodulated and applied to a serial buffer 71 where it is available as information data output on line 72.

The preferred embodiment parallel correlator 59 is shown having a plurality of value inputs $V_a$ to $V_x$ which are produced on bus 73 by the buffer 74. The buffer 74 is loaded through a bus or parallel line 75 coupled to sync word shift register 76. The sync word shift register may be loaded from a sync word generator (not shown) or the sync word may be produced by the microprocessor 66 and loaded into the sync word register 76. The significance of the sync word for timing will be explained hereinafter with regards to the timing circuits.

Figure 3:
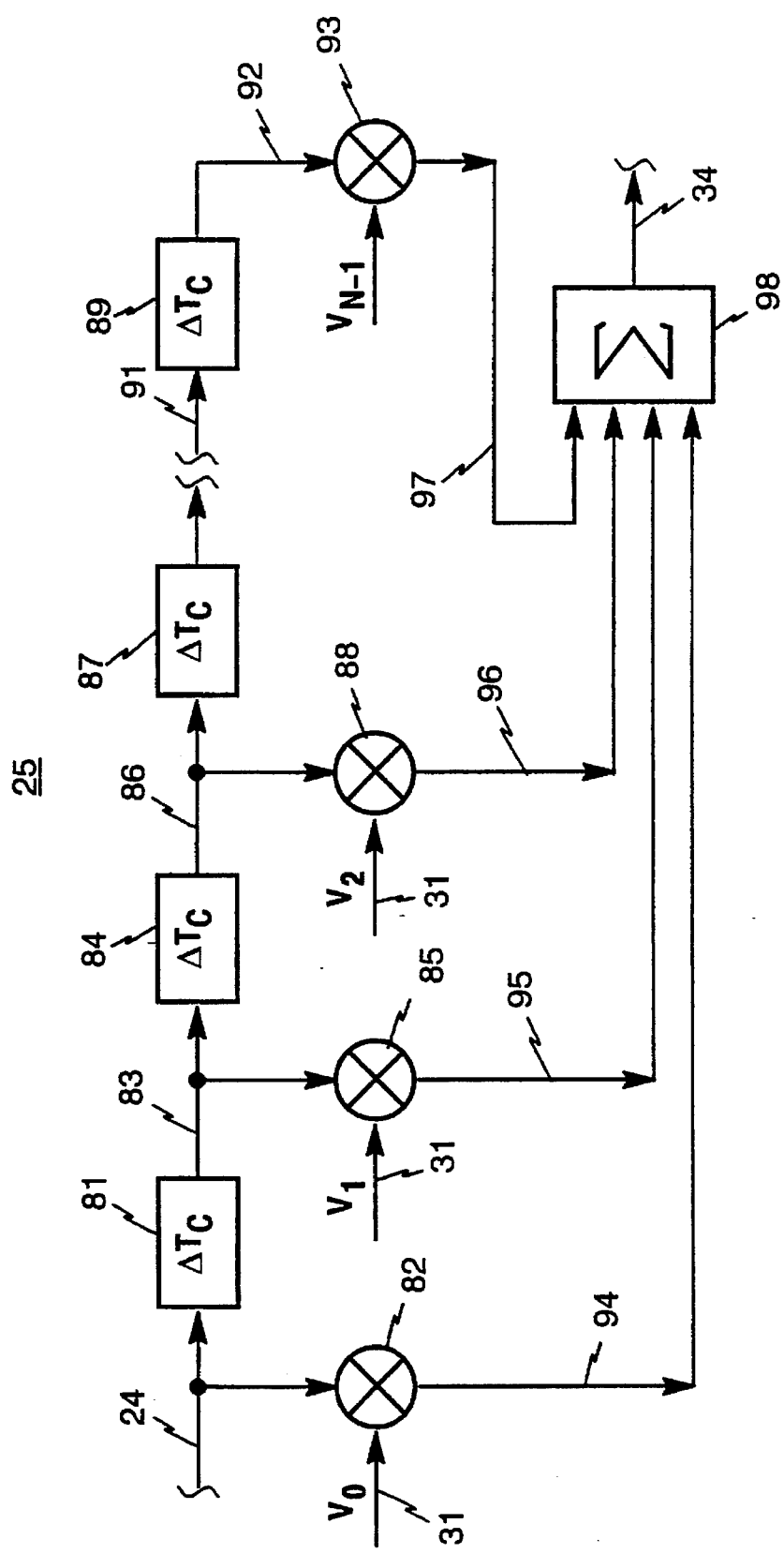
FIG. 3 is a detailed schematic block diagram of a preferred embodiment parallel correlator of the type employed in FIG. 2.

Refer now to FIG. 3 showing a schematic block diagram of a preferred embodiment of a parallel correlator of the type employed in FIG. 2. The parallel correlator 25 shown in FIG. 2 is shown having an input line 24 which is applied to a first delay circuit 81 and to a multiplier 82. The output of the first delay circuit 81 incurs a delay of one chip time on line 83. Line 83 is coupled to a second delay circuit 84 and a second multiplier 85. The output of the second delay circuit is shown on line 86 is applied to a third delay circuit 87 and to a third multiplier 88. The output of the third delay circuit is not designated, but the input to the last delay circuit 89 is shown having an input 91 and an output 92 applied to a last or N-1 multiplier 93. The output of the first, second, third and last multipliers on lines 94 to 97 are applied as inputs to the summing circuit 98 to produce the summed output shown in FIG. 2 as being produced on line 34. Thus, the output shown on line 34 is a coherent accumulation of the information being produced over N chips time duration. The values V0, V1, V2 and VN-1 shown as inputs to the four multiplier circuits are correlation values which are produced by the buffer 29 as described hereinbefore.

Refer now to FIG. 4 showing a schematic timing diagram which is employed to illustrate the novel symbol data times ($T_s$) which comprise a plurality of short codes, each of which is comprised of a plurality of chips. The waveform at the top of FIG. 4 is shown having pulses designated as $T_c$ which are indicative of chip times. It is impossible to show the large number of chips $T_c$ which occur during a short code length SCL. Two or more chips may occur adjacent to each other which are in a high state, and are shown producing a large chip 99. The purpose of FIG. 4 is to show that a data symbol time ($T_s$) comprises a plurality of chip times $T_c$ which embrace a plurality of short code lengths or SCL shown on FIG. 4. In the preferred embodiment of the present invention, as few as several and up to over 100 short code lengths may occur during a data symbol time ($T_s$). The amount of information that is necessary to generate a signal to noise ratio energy level which will enable the circuits shown in FIG. 2 to acquire the short code is employed, and in the preferred embodiment it is anticipated that fewer than 100 data symbol times will be required to acquire the short code.

Refer now to FIG. 5 showing a schematic timing diagram which will be employed to illustrate the novel preamble which precedes the high processing gain long code and the timing of events during processing of the novel preamble which comprises short codes and synchronization data. At the top of FIG. 5, waveform 101 is shown which embraces a plurality of data symbol times $T_s$, each of which contains 1 bit of data, and in this illustration the data symbols are all ones. The last portion of the preamble time is shown designated as known random data, and this information is represented by the waveforms 102 and 103. Point 104 on waveform 101 is referenced as time zero, and the waveforms illustrated increase in time in the right hand direction. The information designated as a parallel correlate and accumulate short code shown at time period 105 is representative of the information on line 24 that is input into the parallel correlator 25 and the digital chip 32. The information at time period 105 represents the front end of the preamble or header. When sufficient information has been processed in the circuit shown in FIG. 2, an alignment signal is generated on line 57 which aligns the PN code generator 26. Alignment occurs during the handoff time period designated as 106. The carrier phase acquisition and tracking function is also achieved in the digital demodulator 32 in the designated time period 108. Once the PN generator 26 is generating a replica short code which is aligned with the incoming PN code, it is now possible to generate the data symbol tracking signal which occurs during the time period 107. At this period in time, the circuit only knows the start and finish of the short code lengths but does not now know the start or finish of the data symbol time $T_s$. At this point in time the preamble or header is also producing known random data, and it is possible for the chip 32 to use this information during the data sync time shown as 108 to internally determine the $T_s$ transitions. At the end of time period 108, the circuits know the exact strobe transition timing $T_s$ which represents a data bit time. Knowing the data bit time, it is now possible to search for sync words previously explained during the explanation of FIG. 2 as being loaded into the sync word shift register 76. The preamble data on line 58 is applied to the correlator 59 at the same time the sync word is available as a replica $V_A$-$V_X$ to a second input via buffer 74 and bus 73. When the sync word aligns with the incoming preamble data or sync word time, it becomes possible to anticipate the upcoming switch point 109 via line 61. When the switch point 109 occurs at the end of the preamble time, the word detect signal is produced on line 63, which starts the long code generator in PN generator 26. The long code generator 26 produces the long code on line 33 as an input to the chip 32 so that the incoming signal on line 24 is modulated by a long code and will be synchronized with the incoming signal. The switching of the short code to the long code occurs instantaneously without loss of synchronization from the short code to the long code in the chip 32.

Having explained a preferred embodiment of the present invention with reference to FIG. 2 employing the timing shown in FIGS. 4 and 5, it will be appreciated that there is no necessity for having a short code which is compatible with the long code. The only relation between the codes that is presently required to accomplish the rapid switching from a short code to the long code is that the chip rate and data symbol rate be the same.

Having explained a preferred embodiment of the present invention, it will now be appreciated that the acquisition and demodulation system shown and described is capable of performing in a stand-by state and receiving a random time burst of information which has the novel preamble, described with reference to FIGS. 4 and 5, to permit the system to acquire and lock onto a short code and switch to a long code before it would be possible for an enemy or an intercepting device to determine the short code and switch to a proper long code since the two are separate and independent from each other. Further, it will be understood that it is not always necessary to employ the preamble or short code to achieve acquisition when continuous communications have been underway. Further, it is possible to vary the short code which is used for acquisition from one event to another by using predetermined information, and since the short code is independent of the long code, the short code length can be varied. While admittedly the short code portion of the acquisition does create a period of potential vulnerability, the information that is transmitted as data after the preamble is coded into a long code has no correlation with the short code and thus is fully protected.

What is claimed is:

1. An apparatus for rapidly acquiring high processing gain (HPG) Pseudo Noise (PN) coded signals, comprising:

preamble parallel correlator means for receiving said high processing gain PN coded signals that are set during data symbol time periods, each of which is designated as ($T_s$), wherein each $T_s$ period comprises a short acquisition preamble header PN code which precedes a long PN code, and said short PN codes have a sequence length that is matched to the length of said preamble parallel correlator, PN replica code generation means having its output coupled to the input of said preamble parallel correlator means for sequentially generating values representative of all possible bit alignments of said short PN codes and for sending said values to said preamble parallel correlator, alignment detection means coupled to the output of said preamble parallel correlator means for detecting values representative of the alignment of said PN replica codes with said received short PN code, bit detection means coupled to the alignment detection means for indicating which of said short PN codes generated by said PN replica code generation means is aligned with said received shod PN code, PN generator alignment means coupled to the output of said bit detection means and having an output coupled to said PN replica code generation means for synchronizing the alignment of the short PN replica code with the received PN coded signals, and digital demodulation and tracking means coupled to said PN replica code generation means for synchronously receiving said high processing gain PN coded signals and for producing output data signals and for discontinuing the sensing of said short PN codes to said preamble parallel correlator upon synchronization of the alignment of the short PN replica code with the received PN coded signals.

2. Apparatus as set forth in claim 1 which further includes a second parallel correlator means coupled to the output of said digital demodulator and tracking means for aligning said output data symbols with said acquisition preamble header.

3. Apparatus as set forth in claim 2 which further includes sync word generation means having its output coupled to the input of said second parallel correlator means for generating a plurality of sync words and for sending them to said second parallel correlator, and threshold comparison means coupled to the output of said second parallel correlator means for detecting the timing of the presence of said sync words in said acquisition preamble header and having an output coupled to said PN replica code generation means for causing said PN replica code generation means to initiate synchronized HPG PN replica coded signals at an input of said digital demodulation and tracking means.

4. Apparatus as set forth in claim 3 wherein said high processing gain PN code is synchronized with the start of said HPG PN coded signals.

5. Apparatus as set forth in claim 1 wherein said alignment detection means comprises coherent accumulator means having its input coupled to the output of said preamble parallel correlator means, an absolute value detector having its input coupled to the output of said coherent accumulator means, noncoherent accumulator means having its input coupled to the output of said absolute value detector and search and compare means having its input coupled to the output of said noncoherent means for identifying a PN code in alignment with the incoming short PN code having its output coupled to the input of said PN generator alignment means for controlling the synchronization of said short PN replica code with the received short PN code.

6. Apparatus as set forth in claim 1 further comprising activating means coupled to PN replica code generation means for activating said digital demodulation and tracking means to track said short PN code wherein said acquisition preamble header comprises a plurality of data symbol times sufficient to permit acquisition of said short PN code.

7. Apparatus as set forth in claim 6 further comprising a second parallel correlator means coupled to said digital demodulation and tracking means for synchronizing said short PN code with said high performance main PN code.

8. A method of rapidly acquiring a long PN code in real time comprising the steps of:

receiving a long PN code having a shod PN code in an acquisition preamble header, acquiring said short PN code with a preamble parallel correlator that has a length equal to or greater than the length of the short PN code and is used to correlate said short PN code but not said long PN code, synchronizing a digital demodulator and tracking device to receive said short PN code and the long PN code which follows said acquisition preamble header, generating a data symbol time signal output from said digital demodulator and tracking device which coincides with a plurality of shod PN codes, recovering a carrier phase signal from said acquisition preamble header in said digital demodulator, decoding a sync word in said acquisition preamble header to produce a switch signal at a predetermined time before the end of said acquisition preamble header which precedes said long PN code, and simultaneously switching to a long PN replica code at an input to said digital demodulator and tracking device and terminating the generation of a short PN replica code to said preamble parallel correlator upon the production of said switch signal.

9. A method as set forth in claim 8 wherein the said shod PN code is a code that is not related to said long PN code except that the chip and symbol rates are the same, and that there are a known integral number of shod PN code time periods per data symbol time period.

\* \* \* \* \*